United States Patent
Hiasa (10) Patent No.: US 10,922,799 B2
(45) Date of Patent: Feb. 16, 2021

(54) IMAGE PROCESSING METHOD THAT PERFORMS GAMMA CORRECTION TO UPDATE NEURAL NETWORK PARAMETER, IMAGE PROCESSING APPARATUS, AND STORAGE MEDIUM

(71) Applicant: CANON KABUSHIKI KAISHA, Tokyo (JP)

(72) Inventor: Norihito Hiasa, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 139 days.

(21) Appl. No.: 16/240,864

(22) Filed: Jan. 7, 2019

(65) Prior Publication Data
US 2019/0213719 A1    Jul. 11, 2019

(30) Foreign Application Priority Data
Jan. 10, 2018    (JP) .................................. 2018-001552

(51) Int. Cl.
*G06N 3/08*    (2006.01)
*G06T 5/50*    (2006.01)
*G06T 5/00*    (2006.01)
*H04N 1/60*    (2006.01)

(52) U.S. Cl.
CPC ............ *G06T 5/009* (2013.01); *G06N 3/084* (2013.01); *G06T 5/50* (2013.01); *H04N 1/6027* (2013.01); *G06T 2207/20081* (2013.01)

(58) Field of Classification Search
None
See application file for complete search history.

(56) References Cited

U.S. PATENT DOCUMENTS

| | | | |
|---|---|---|---|
| 9,373,160 B2 | 6/2016 | Fergus et al. | |
| 2010/0053709 A1* | 3/2010 | Minami | H04N 1/60 358/518 |
| 2011/0044494 A1* | 2/2011 | Bradley | G10L 19/032 382/100 |
| 2015/0235612 A1 | 8/2015 | Okumura | |
| 2015/0341604 A1* | 11/2015 | Cote | H04N 9/64 348/242 |
| 2018/0158177 A1* | 6/2018 | Lannes | G06K 9/36 |
| 2018/0315155 A1* | 11/2018 | Park | G06F 17/153 |
| 2018/0322614 A1* | 11/2018 | Petrova | G06T 5/20 |

FOREIGN PATENT DOCUMENTS

JP    2016031747 A    3/2016

OTHER PUBLICATIONS

Mao et al. "Image Restoration Using Convolutional Auto-encoders with Symmetric Skip Connections." https://arxiv.org/abs/1606.08921. 2016: 1-17. Cited in the Specification.

* cited by examiner

*Primary Examiner* — Idowu O Osifade
(74) *Attorney, Agent, or Firm* — Rossi, Kimms & McDowell LLP (57) ABSTRACT

An image processing method includes the steps of acquiring a training image and a correct image, inputting the training image into a multilayer neural network to generate an output image, performing a gamma correction for each of the correct image and the output image and calculating an error between the correct image after the gamma correction and the output image after the gamma correction, and updating a network parameter of the neural network using the error.

11 Claims, 7 Drawing Sheets

IMAGE PROCESSING METHOD THAT PERFORMS GAMMA CORRECTION TO UPDATE NEURAL NETWORK PARAMETER, IMAGE PROCESSING APPARATUS, AND STORAGE MEDIUM

BACKGROUND OF THE INVENTION

Field of the Invention

The present invention relates to an image processing method using deep learning.

Description of the Related Art

U.S. Pat. No. 9,373,160 discloses a method for estimating an image having no images of stains or water droplets, using a convolutional neural network, based on an input image obtained by capturing an object image through glass. The method disclosed in U.S. Pat. No. 9,373,160 uses the convolutional neural network to detect images of stains and water droplets and to inpaint the detected region. X. Mao, C. Shen, Y Yang, "Image Restoration Using Convolutional Auto-encoders with Symmetric Skip Connections", https://arxiv.org/abs/1606.08921 ("Mao et al.") discloses a network configuration universally applicable to a variety of regression problems. In addition, Mao et al. discloses upsampling of an input image, JPEG deblocking (compression noise reductions), denoising, nonblind deblur or inpainting, using the network.

However, none of the methods of U.S. Pat. No. 9,373,160 and Mao et al. can properly estimate the image when the input image is a RAW image.

An attempt to input a RAW image to a multilayer neural network and to estimate a desired output image needs to use the RAW image for the neural network learning. The learning optimizes the network parameter by minimizing an error (difference) between an output obtained by inputting the training RAW image to the network and the correct (Ground Truth) RAW image. The error in the learning is minimized in the state of the RAW image (in which a light amount and a signal value have a substantially linear relationship). Nevertheless, when the user actually views a developed output image, the error changes depending on the magnitude of the signal value because the gamma correction is executed. More specifically, the error grows in dark part in the estimated image, and the estimation accuracy is lowered.

SUMMARY OF THE INVENTION

The present invention provides an image processing method, an image processing apparatus, and a storage medium which can acquire a multilayer neural network in which the estimation accuracy is less likely to be influenced by the magnitude of a developed image signal.

An image processing method according to one aspect of the present invention includes the steps of acquiring a training image and a correct image, inputting the training image into a multilayer neural network to generate an output image, performing a gamma correction for each of the correct image and the output image and calculating an error between the correct image after the gamma correction and the output image after the gamma correction, and updating a network parameter of the neural network using the error.

An image processing apparatus according to another aspect of the present invention includes an acquisition unit configured to acquire a training image and a correct image, a generation unit configured to input the training image into a multilayer neural network to generate an output image, a calculation unit configured to perform a gamma correction for each of the correct image and the output image and to calculate an error between the correct image after the gamma correction and the output image after the gamma correction, and an updating unit configured to update a network parameter of the neural network based on the error.

A non-transitory computer-readable storage medium configured to store a program for causing a computer to execute the above image processing method also constitutes another aspect of the present invention.

Further features of the present invention will become apparent from the following description of exemplary embodiments with reference to the attached drawings.

DESCRIPTION OF THE EMBODIMENTS

Referring now to the accompanying drawings, a detailed description will be given of embodiments according to the present invention. In each figure, the same reference numerals are given to the same members, and duplicate explanation will be omitted.

Initially, terms will be defined as follows. The present invention relates to a method for solving a regression problem through deep learning and for estimating a variety of output images from an input image. The deep learning is machine learning using a multilayer neural network. Learning a network parameter (such as a weight and bias) based on a pair of many training images and corresponding correct images (desired outputs or ground truths) enables an accurate estimation based on an unknown input image.

The image processing using the multilayer neural network has two steps or the processing step of determining the network parameter (weight and bias) and the processing step of estimating an image based on an unknown input using the determined parameter. Hereinafter, the former step will be called learning step, and the latter step will be called estimation step. The present invention is characterized in the learning step.

Next, an image name is determined in the learning step and the estimation step. An image input to the network is called an input image and also called a training image in a particular case where a correct image is known for the input image used for the learning step. An image output from the network is called an output image, and the output image in the estimation step is particularly called an estimated image.

The input image to the network and the correct image are RAW images. The RAW image is undeveloped image data output from the image sensor, and a light amount of each pixel and a signal value have a substantially linear relationship. The RAW image is developed before the user views the image, and a gamma correction is executed at that time. The gamma correction is, for example, processing of exponentiating the input signal value with the power of 1/2.2 or the like.

The output image is also generated as a quasi-correct image by the estimation, and thus has the property of a RAW image. The estimation step includes various processing, such as upsampling, denoising, compression noise reductions, deblurring (blur corrections), inpainting, demosaicing, dehazing, high gradation processing, color component estimations (colorizations of monochomes, etc.), relighting (changes of an illumination environment).

Next follows a brief summary of the present invention. The present invention considers the influence of the gamma correction in the learning step of the multilayer neural network to which a RAW image is input. This configuration can maintain approximately constant the estimation accuracy regardless of the magnitude of the signal value of the post-development estimated image. In particular, this configuration can suppress the undershoot and ringing that are likely to occur with the high resolution (upsampling or deblurring) and the high contrast (dehazing).

Figure 2:
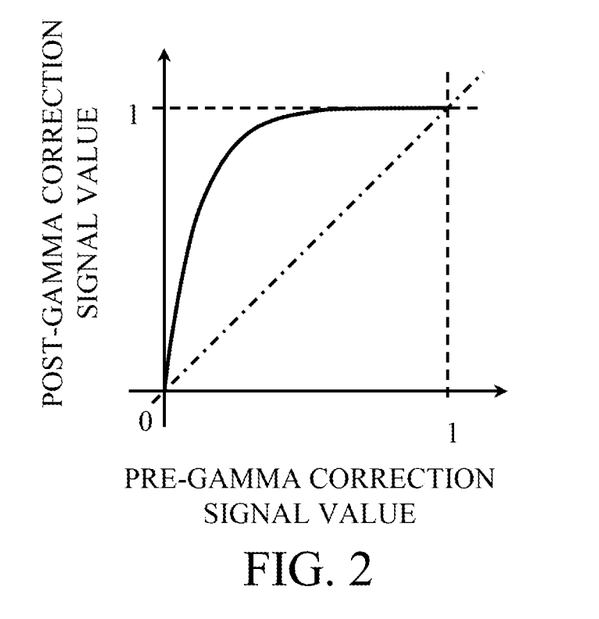
FIG. 2 explains a gamma correction.

One method of considering the gamma correction in the learning according to the present invention is to gamma-correct the output image from the network and the correct image before calculating the error to be minimized. In addition to this method, another conceivable method includes a method for gamma-correcting a correct image and an input image before the input image enters the network, or a method of performing processing corresponding to the gamma correction in the network. The method according to the present invention maintains the substantially linear relationship between the light amount and the signal value in the output image (including the estimated image), whereas the latter two methods set up the post-gamma correction relationship between the light amount and the signal value in the output image. Thus, the latter two methods need an inverse gamma correction to the output image before the normal development processing. There are a variety of gamma corrections, and the gradation collapse in the high luminance part may be problematic. The solution of the inverse gamma correction may not be uniquely determined in some cases. FIG. 2 illustrates one example.

FIG. 2 explains the gamma correction, and illustrates an illustrative gamma curve used for the gamma correction. In FIG. 2, the abscissa axis represents the pre-gamma correction signal value, the ordinate axis represents the post-gamma correction signal value, and the respective signal values are normalized. In the gamma curve illustrated in FIG. 2, the post-gamma correction signal values have the same values in the high luminance part. Thus, the inverse gamma correction cannot determine the signal value in this part. The gradation collapse in the high luminance part may prevent the user from obtaining the correct image in the editing work, such as an exposure adjustment, in the development. One conceivable solution is, for example, to reinput the RAW image in the adjusted exposure state as an input image to the network when the user performs the exposure adjustment. However, this method needs the recalculation in the network whenever the user adjusts the exposure, and thereby the calculation load increases. Accordingly, the method according to each the following embodiments can suppress the high-luminance gradation collapse and the increase in the calculation load.

First Embodiment

A description will now be given of an image processing system according to a first embodiment of the present invention. The image processing system according to this embodiment includes, as separate components, an apparatus (parameter learning apparatus 101) that executes learning step and an apparatus (image editing apparatus 111) that perform estimation step. Although the estimation step according to this embodiment is, but not limited to, a correction (a type of deblur) of the blur caused by the aberration and/or diffraction.

Figure 3:
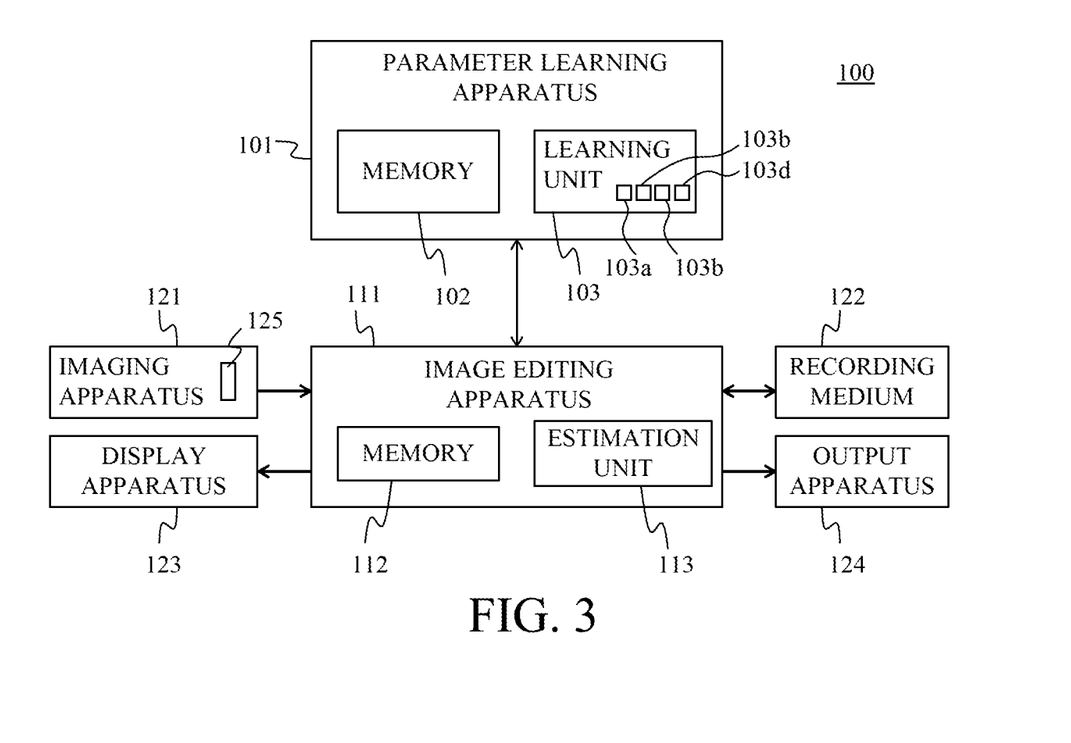
FIG. 3 is a block diagram of an image processing system according to the first embodiment.
Figure 4:
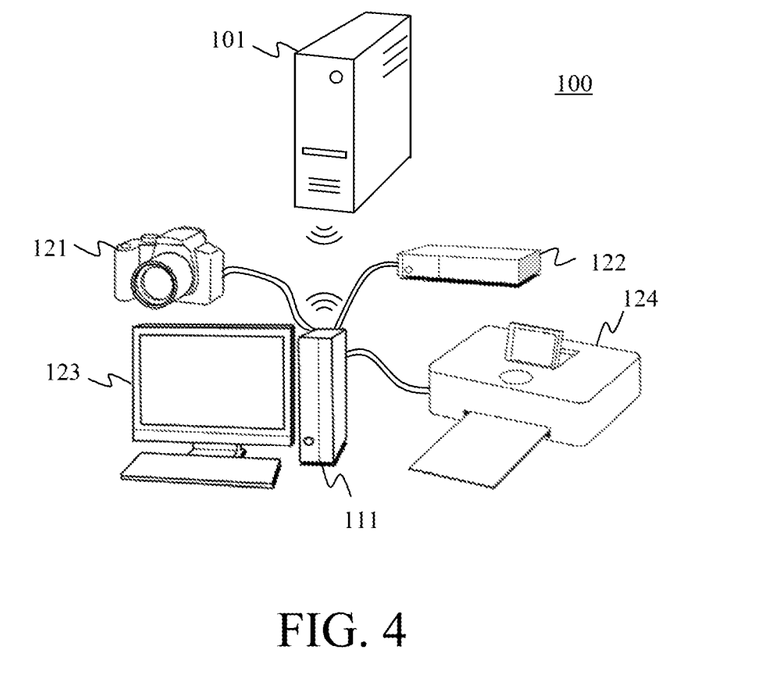
FIG. 4 is an external overview of the image processing system according to the first embodiment.

Referring now to FIGS. 3 and 4, a description will be given of an image processing system according to this embodiment. FIG. 3 is a block diagram of the image processing system 100. FIG. 4 is an external overview of the image processing system 100. As illustrated in FIGS. 3 and 4, the image processing system 100 includes the parameter learning apparatus 101, the image editing apparatus 111, an imaging apparatus 121, a display apparatus 123, a recording medium 122, and an output apparatus 124.

The parameter learning apparatus 101 is an image processing apparatus that executes the learning step, and includes a memory (or storage unit) 102 and a learning unit 103. The learning unit 103 executes the learning step that calculates a network parameter (such as a weight and a bias) required for the estimation step. Then, the learning unit 103 uses a plurality of training images and correct images stored in the memory 102. The training image and the correct image are different from each other in the presence of a blur caused by the aberration and/or diffraction.

The learning unit 103 according to this embodiment includes an acquisition unit 103a, a generation unit 103b, a calculation unit 103c, and an updating unit 103d. The acquisition unit 103a acquires the training image and the correct image. In this embodiment, each of the training image and the correct image is a RAW image. The generation unit 103b inputs a training image into a multilayer neural network to generate an output image. The calculation unit 103c performs a gamma correction for each of the correct image and the output image and calculates an error between the gamma-corrected correct image and gamma-corrected output image. The updating unit 103d updates the network parameter of the neural network based on the error calculated by the calculation unit 103c. Details of the learning step will be described later with reference to flowcharts. The learned network parameter is stored in the memory 102.

The image editing apparatus 111 executes the estimation step, and includes a memory 112 and an estimation unit 113. The imaging apparatus 121 includes an image sensor 125, such as a CMOS sensor and a CCD sensor, photoelectrically converts an optical image formed by an optical system (imaging optical system), and outputs a captured image. The image editing apparatus 111 acquires the captured image as a RAW image from the imaging apparatus 121 that is connected by wire or wirelessly, or a recording medium 122, such as a semiconductor memory, and stores the captured image in the memory 112. The estimation unit 113 acquires an input image from the captured image and inputs the input image into the multilayer neural network to generate an estimated image in which a blur caused by the aberration and/or diffraction is corrected. The image editing apparatus 111 and the parameter learning apparatus 101 are connected to each other by wire or wirelessly, and the image editing apparatus 111 reads the network parameter stored in the memory 102 and uses it for the estimation step. The image editing apparatus 111 generates a captured image in which the blur caused by the aberration and/or diffraction is corrected, based on the estimated image, and outputs the corrected captured image to at least one of the recording medium 122, the display apparatus 123, and the output apparatus 124. The display apparatus 123 is, for example, a liquid crystal display or a projector. The user can work the image while confirming the image being edited via the display apparatus 123. The output apparatus 124 is a printer or the like. The image editing apparatus 111 may serve to provide development processing and the like.

Figure 5:
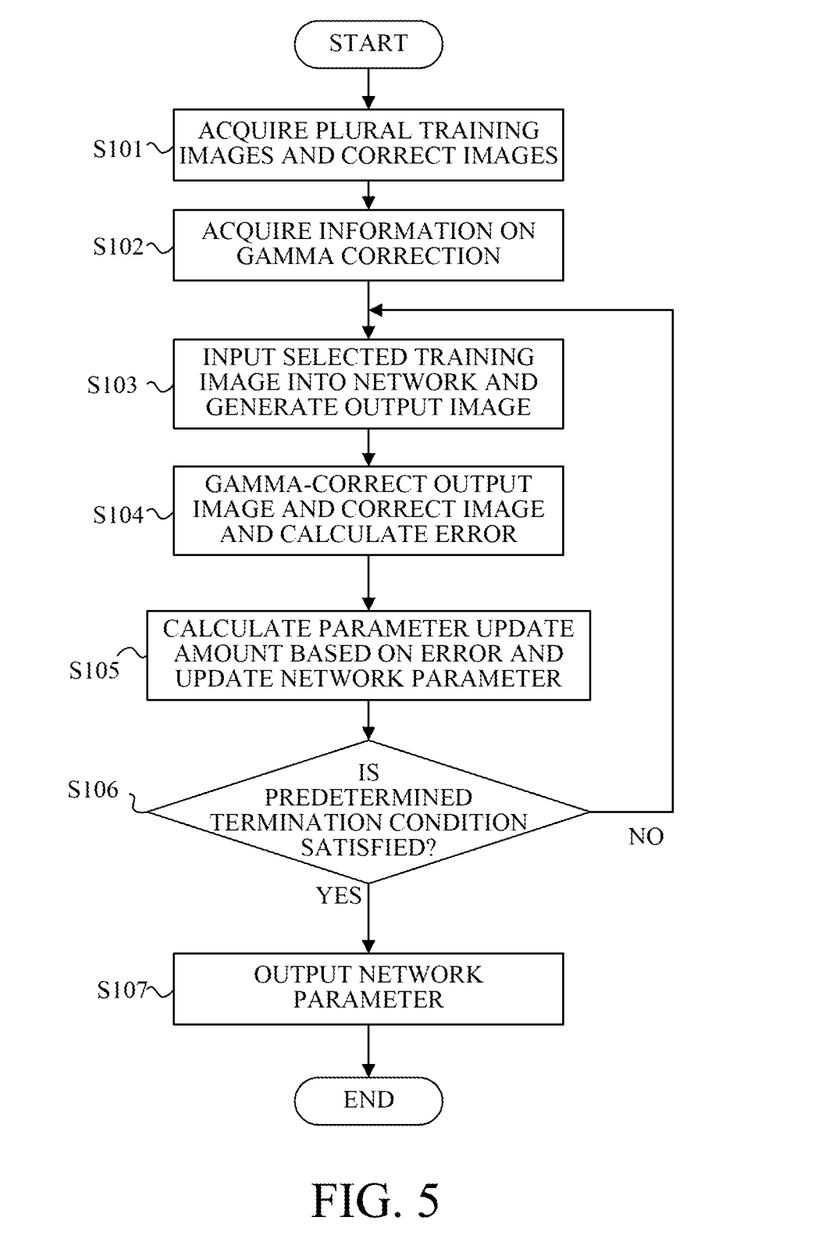
FIG. 5 is a flowchart of learning step according to each embodiment.

Next, referring now to FIG. 5, a description will be given of the learning step executed by the learning unit 103 in the parameter learning apparatus 101. FIG. 5 is a flowchart of the learning step. Each step in FIG. 5 is executed by each unit (the acquisition unit 103a, the generation unit 103b, the calculation unit 103c, and the updating unit 103d) in the learning unit 103.

First, in the step S101, the learning unit 103 (acquisition unit 103a) acquires a plurality of training images and the correct images from the memory 102. Each of the training image and the correct image is an undeveloped RAW image. The training image is an image blurred by the aberration and/or diffraction. The correct image contains the same object as the training image, and no (or very few) blurs. The training image can be generated by applying a blur caused by aberration and/or diffraction in a simulation, to a RAW image (correct image) having little influence of aberration and/or diffraction. The training image and the correct image can be generated by capturing the same object with a different F-number. For example, the training image is an image made with an almost open aperture and subject to the aberrational influence, and the correct image is an image made with a narrow aperture to a certain degree and having the suppressed deterioration caused by the aberration and/or diffraction. A blur caused by the aberration and/or diffraction which is not included in the learning step, or a structure (such as an edge) of the object cannot be accurately estimated in the subsequent estimation step. Hence, the learning unit 103 acquires a plurality of training images and the correct images in the step S101 so as to cover structures of various types of objects and the blurs of the aberration and/or diffraction to be corrected.

The learning step can be similarly executed by preparing a pair of the training image and the correct image in simulation, for processing other than the correction of the blur caused by the aberration and/or diffraction. For denoising, the training image can be generated by providing a low-noise correct image with a conceivable noise. The upsampling will be described later in the second embodiment. For the compression noise reduction, the training image can be generated by compressing a correct image with no compressions or a small compression ratio. For deblurring other than the aberration and/or diffraction (such as a defocus blur), the training image can be generated by convolving a less blurred correct image with a conceivable blur. The defocus blur depends on the distance, and thus a plurality of training images and correct images are convoluted with the defocus blurs of different distances. For inpainting, the training image can be generated by providing a defect to a defectless correct image. For demosaicing, the training image can be generated by resampling a correct image captured by a three-plate type image sensor etc. with a Bayer array or the like. For dehazing, the training image can be generated by applying scattered light to a correct image having no fog or haze. With the fog and the haze, the intensity of the scattered light varies depending on the concentration and the distance, and a plurality of training images are generated for scattered light of different densities and distances. For the high gradation (enhanced gradation), the training image can be generated by reducing the gradation level of the high gradation correct image. For the estimation of the color component, the training image can be generated by reducing the color component in the correct image having a plurality of color components. For relighting, the training image in a different light source environment can be generated in simulation if the distributions of the normal, the shape, and the reflectance of the object in the correct image are known. Since the measurement load is large in this case, a pair of the correct image and the training image may be generated by actually capturing an object in different illumination environments.

Next, in the step S102 the learning unit 103 (acquisition unit 103a) acquires information on the gamma correction used for the learning step. When the gamma correction used for the learning step is combined with the gamma correction used to develop the estimated image, an estimation with a stable accuracy is available which does not depend on the magnitude of the corrected signal value. In this embodiment, in order to deal with a variety of gamma corrections, the learning unit 103 executes the learning step for each of a plurality of gamma corrections, and stores the network parameter optimized in each gamma correction in the memory 102. The information on the gamma correction can be acquired from the information of a plurality of gamma corrections stored in the memory 102, or the user may input a gamma correction expression, a lookup table, or the like. As illustrated in FIG. 2, the gamma correction is processing that makes a curve (gamma curve) showing the relationship between the pre-correction signal value and the post-correction signal value equal to or higher than a straight line with slope of 1 (alternate long and short dash line in FIG. 2). More specific examples of the function g representing the gamma correction include the following expressions (1) to (3).

$$g(s)=s^{1/\gamma} \qquad (1)$$

$$g(s)=\log_\alpha(\beta \cdot s+1) \qquad (2)$$

$$g(s)=1-\exp(-\delta \cdot s) \qquad (3)$$

In the expressions (1) to (3), "s" represents a normalized signal value before gamma correction is performed, and α (>1), β (>0), γ (>1), and δ (>0) are constants. The gamma correction is not limited to the expressions (1) to (3), but may be provided with a piecewise linear function or a lookup table. The step S102 may be executed at any time as long as it is performed prior to the step S104.

Next, in the step S103, the learning unit 103 (generation unit 103b) selects at least one of the plurality of training images acquired in the step S101, inputs the selected training image into the network, and calculates (generates) the output image. The case where all of a plurality of training images are selected (all training images are input to the network and the network parameters are updated with all the outputs) is called batch learning. This method results in a bulk computation load, as the number of training images increases. Selecting only one training image (using only one training image to update the network parameter and using a different training image for each update) is called online learning. This method does not increase a computation amount even if the total number of training images increases, but is subject to the influence of the noises in a single training image. Thus, a mini-batch method may be used which selects some (mini batch) of a plurality of training images and updates the network parameter using them. The next update selects and uses a different mini-bach of training images. The problems of the batch learning and the online learning can be solved or mitigated by repeating this processing.

Figure 1:
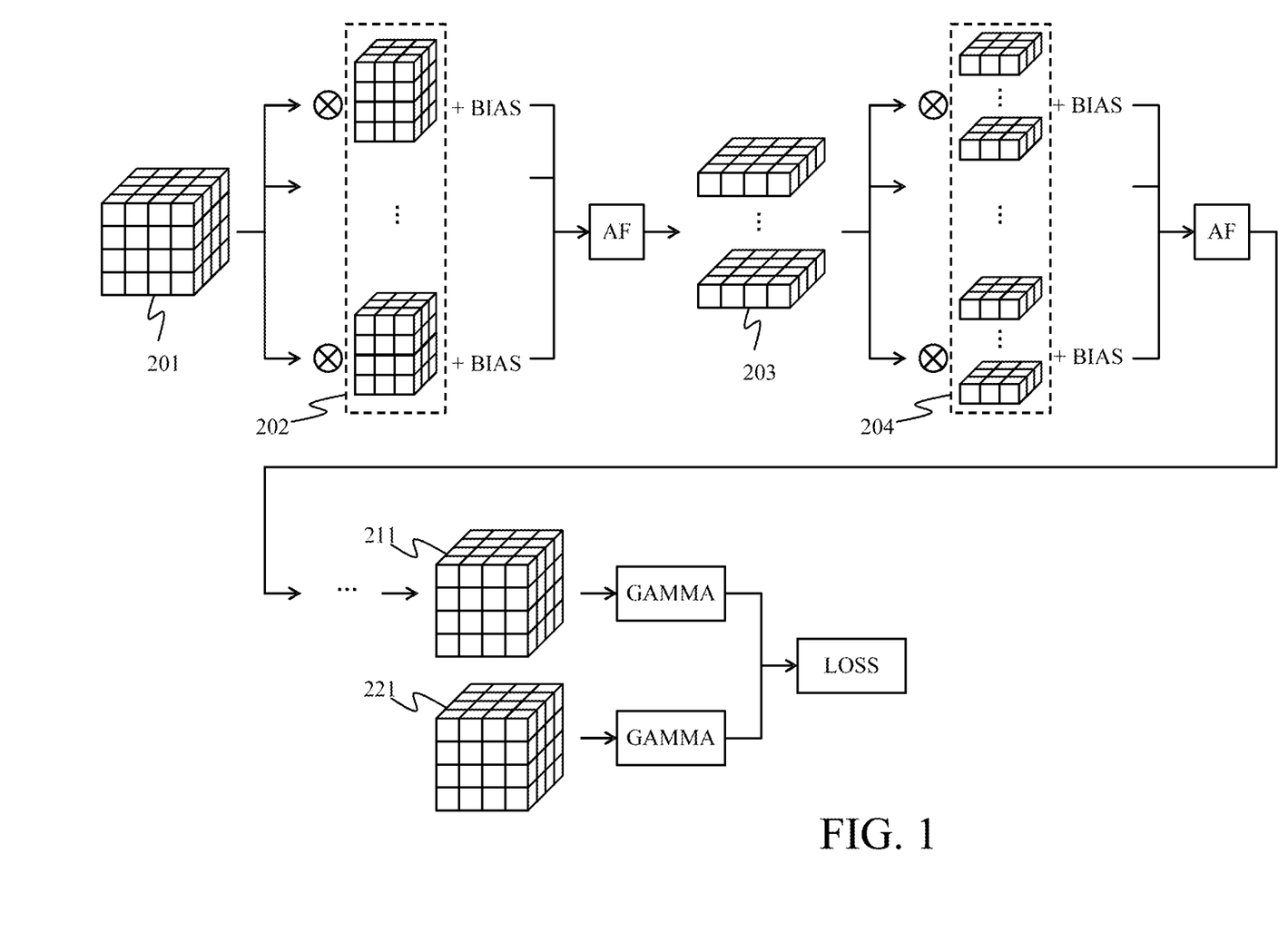
FIG. 1 illustrates a convolutional neural network according to each embodiment.

Referring now to FIG. 1, a description will be given of processing in the multilayer neural network. FIG. 1 illustrates a convolutional neural network ("CNN"). This embodiment is not limited to this example and, for instance, a residual network may be employed for the CNN or a GAN (Generative Adversarial Network) or the like may be used. FIG. 1 illustrates only one input training image 201 for simplicity purposes, but in reality, an output image is generated for each of a plurality of selected training images. The training image 201 is made by arranging RAW images in three-dimensional directions for each color component.

Figure 6A:
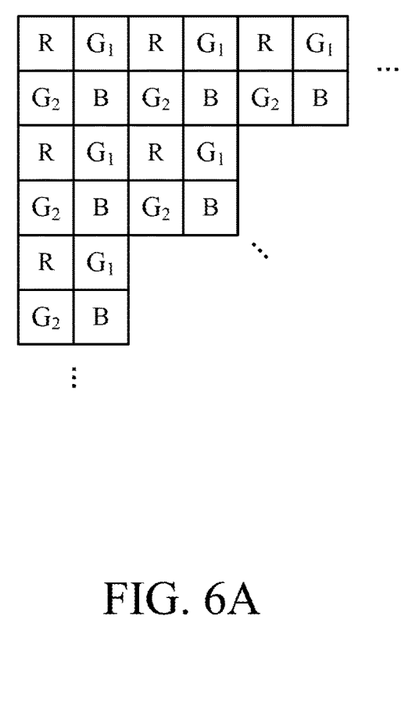
FIGS. 6A and 6B explain color components in the image according to each embodiment.
Figure 6B:
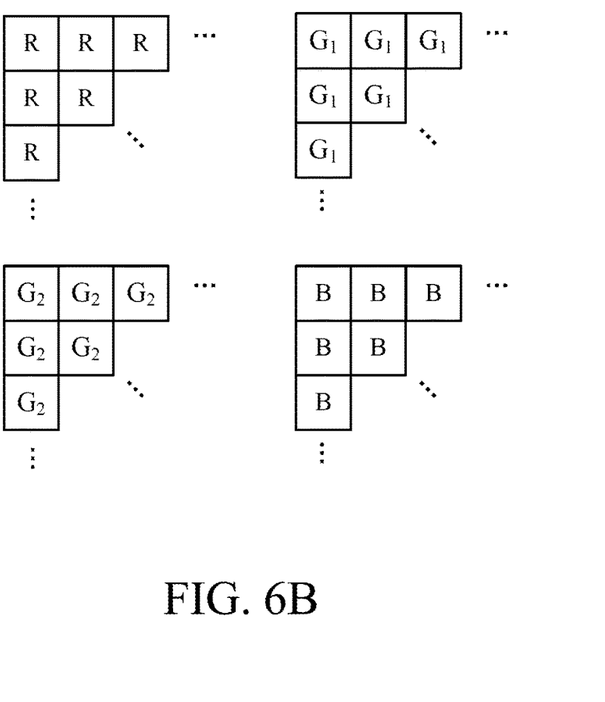

FIGS. 6A and 6B explain color components in the image. In this embodiment, the training image has a Bayer array as illustrated in FIG. 6A, where R, G, and B stand for red, green, and blue, respectively. FIG. 6B illustrates a configuration in which only the same color components are again arrayed based on the Bayer array in FIG. 6A. G has two types of G1 and G2, and each color component is extracted and arranged. A four-channel image in which the four images in FIG. 6B are arranged in the three-dimensional direction is the training image 201 in FIG. 1. Although this work is not always necessary, the aberration and/or diffraction vary according to wavelengths and the correction becomes easier by arranging the same color components having the same blur. When RGB are arranged in the same dimension, pixels with locally different luminances are mixed and the estimation accuracy tends to decrease. Hence, the training image may be separated for each color component. This example illustrates the Bayer array, but is similarly applicable to another array (such as a honeycomb structure). The color component may not be rearranged in case of the monochrome. This embodiment illustrates an example in which a plurality of color components are collectively learned and estimated, but learning and estimation may be individually performed for each color. FIG. 1 illustrates the 4×4 or four-channel image as the training images 201 for simplicity purposes, but the vertical and horizontal image sizes are not limited to this example.

Each of the training image and the correct image has a plurality of periodically arranged color components in this embodiment, and this embodiment may include the step of generating color component images that includes respective color components in the training image or the correct image. The step of generating the color component image is executed before the training image is input to the neural network, and before the error is calculated with the correct image.

The CNN has a plurality of layers, and executes the linear conversion and nonlinear conversion in each layer. The linear conversion is expressed by the sum of the convolution of the input image (or feature map) with the filter and the bias ("BIAS" in FIG. 1). The weight and bias of the filter in each layer is called a network parameter, and their values are determined and updated by the learning step. The nonlinear conversion is a conversion by a nonlinear function called an activation function ("AF" in FIG. 1). An illustrative activation function includes a sigmoid function and a hyperbolic tangent function. This embodiment uses a ReLU (Rectified Linear Unit) expressed by the following expression (4).

$$f(x)=\max(x,0) \qquad (4)$$

In the expression (4), "max" represents a MAX function that outputs a maximum value among arguments.

The training image 201 input to the input layer is convoluted with each of the plurality of filters 202 in the first convolution layer and added to the bias. The number of channels in each filter 202 accords with that of the training image 201, and the filter 202 is a three-dimensional filter (the third dimension represents the number of channels) is used when the number of channels of the training image 201 is 2 or more. The filter has arbitrary vertical and horizontal sizes. The result of the convolution and sum is nonlinearly converted by the activation function, and a first feature map 203 is output to a first intermediate layer. The number of channels (the number of arrays in the three-dimensional direction) in the first feature map 203 is the same as that of the filter 202. Next, the first feature map 203 is input to the second convolution layer, and the sum of the convolution with each of the plurality of filters 204 and the bias is calculated in the same manner as described above. The result is nonlinearly converted, and similarly repeated by the number corresponding to the number of convolution layers. In general, the CNN with three or more convolution layers corresponds to the deep learning. The result output from the last convolution layer is an output image 211 from the CNN. It is unnecessary for the final convolution layer to perform the nonlinear conversion by the activation function.

Next, in the step S104, the learning unit 103 (calculation unit 103c) performs the gamma correction for each of the output image 211 and the correct image 221 to calculate an error between the gamma-corrected output image and the gamma-corrected correct image. Similar to the training image 201, the correct image 221 is arranged for each color component and stacked in the channel direction. In this embodiment, the learning unit 103 calculates an error L using the following expression (5).

$$L = \frac{1}{2N} \sum_{j}^{N} |g(t_j) - g(y_j)|^2 \qquad (5)$$

In the expression (5), "t" is a signal value of the correct image 221, "y" is a signal value of the output image 211, "j" is a pixel number, "N" is the total number of pixels, and "g" is the gamma correction. The expression (5) uses the Euclidean norm, but may use another index as long as it represents a difference between the correct image and the output image.

Next, in the step S105, the learning unit 103 (updating unit 103d) calculates an update amount of the network parameter based on the error calculated in the step S104, and updates the network parameter. This example uses an error back propagation method (or backpropagation). The error back propagation method calculates the update amount based on the differential of the error. However, this embodiment is not limited to this example.

Next, in the step S106, the learning unit 103 determines whether a predetermined termination condition is satisfied or the optimization of the network parameter has ended. The predetermined termination condition, as used herein, includes, for example, whether the learning step has reached a predetermined time, whether the number of parameter updates has reached a predetermined number of times, whether a training image and a correct image not used to update the parameter are prepared and the error between the output image and the correct image falls below a predetermined value, or the like. Alternatively, the user may instruct the end of the optimization. If the predetermined termination condition is not satisfied, the flow returns to the step S103, and the learning unit 103 acquires a new mini-batch and updates the network parameter. On the other hand, if the predetermined termination condition is met, the flow proceeds to the step S107.

In the step S107, the learning unit 103 outputs the determined network parameter to the memory 102. The memory 102 stores the network parameters. According to this embodiment, since the learning unit 103 learns the network parameter for each different gamma correction, the memory 102 stores the network parameter and the corresponding gamma correction information together. The above learning step can provide a multilayer neural network in which the estimation accuracy is hardly influenced by the magnitude of the signal value of the developed image.

Figure 7:
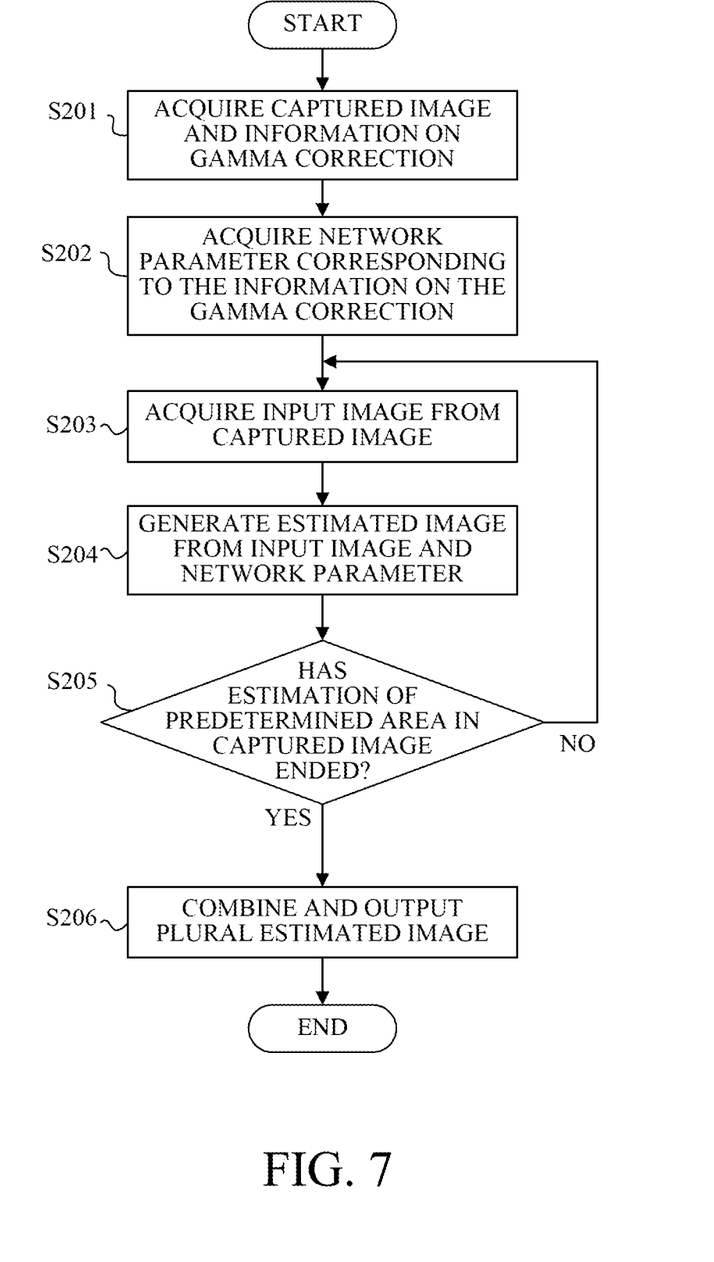
FIG. 7 is a flowchart of the estimation step according to each embodiment.

Referring now to FIG. 7, a description will be given of the estimation step executed by the estimation unit 113 in the image editing apparatus 111. FIG. 7 is a flowchart of the estimation step.

Initially, in the step S201, the estimation unit 113 acquires a captured image from the imaging apparatus 121 or the recording medium 122. The captured image is an undeveloped RAW image. Where the RAW image has a coded signal value, the estimation unit 113 executes decoding processing. The estimation unit 113 acquires information on the gamma correction used to develop the captured image later.

Next, in the step S202, the estimation unit 113 acquires a network parameter corresponding to the information on the gamma correction acquired in the step S201. The network parameter is read out of the memory 102 in the parameter learning apparatus 101. Alternatively, a plurality of network parameters may be stored in advance in the memory 112 in the image editing apparatus 111 and read out of the memory 112. The network parameter to be acquired corresponds to the information on the gamma correction obtained in the step S201 and the information on the gamma correction used in the learning step which accord with or close to each other.

Next, in the step S203, the estimation unit 113 acquires an input image to be input to the CNN, from the captured image. Similar to the training image, the input image is arrayed for each color component and stacked in the three-dimensional direction. The size of the input image in the estimation step does not necessarily match the size of the training image in the learning step. Next, in the step S204, the estimation unit 113 generates an estimated image based on the input image and the network parameter. As in the learning step, the CNN illustrated in FIG. 1 is used to generate the estimated image. The output image 211 in FIG. 1 is the estimated image, and the subsequent gamma corrections and error calculations from the correct image are not performed.

Next, in the step S205, the estimation unit 113 determines whether estimating a predetermined area in the captured image (correction of the blur caused by the aberration and/or diffraction in this embodiment) has been completed. If the estimation has not yet been completed, the flow returns to step S203, and the estimation unit 113 acquires a new input image from the predetermined area in the captured image. When the output image is smaller than the input image in the CNN used for the estimation, it is necessary to acquire the input image overlapping the predetermined area. The predetermined area is the whole or part of the captured image. The captured image is a RAW image, and may include, in addition to the image obtained through light receiving, information on a header (information on the number of pixels in the image, the imaging time, etc.) and optical black of the image sensor. The header and optical black are irrelevant to the blur caused by the aberration and/or diffraction, and they may be removed from predetermined area.

Next, in the step S206, the estimation unit 113 combines the plurality of generated estimated images with each other and outputs the captured image in which the blur caused by the aberration and/or diffraction has been corrected. If necessary, the estimation unit 113 may output information on the header and the optical black. The above estimation step can suppress the influence on the magnitude of the developed signal value, and corrects the blur caused by the aberration and/or diffraction. After the estimation step, the user arbitrarily performs editing such as the exposure correction, and obtains a final developed image through the development processing.

Next follows a description of a condition for increasing the effect of the present invention. First, the step of normalizing the signal values of the input image to be input to CNN and the correct image may be provided. Depending on the configuration of the imaging apparatus, the captured image has a different signal value range. When the signal value range of the input image is different between the learning step and the estimation step, a correct estimation result cannot be obtained. Hence, the signal value may be normalized. The signal value range is defined by a lower limit value (signal value of the optical black) and an upper limit value (luminance saturation value). Information on the signal value range can be obtained from the header and the optical black area in the captured image. More specifically, the normalization may be made, for example, according to the following expression (6).

$$s_{nor} = \frac{s - s_{OB}}{s_{satu} - s_{OB}} \quad (6)$$

In the expression (6), "s" represents a signal value of the RAW image, "$s_{OB}$" represents a signal value of the optical black, "$s_{satu}$" represents a luminance saturation value of the signal, and "$s_{nor}$" represents a normalized signal value. The estimation step performs the inverse operation of Expression (6) for the output estimated image to restore it to the original scale.

In using the gamma correction expressed by the expressions (1) or (2) for the error in the expression (5), the differential may diverge near the point where the signal value of the output image becomes zero. When the differential of the error diverges, the error back propagation method does not work properly. Depending on the gamma correction expression, when the signal value to be corrected does not fall within a certain range, an expected correction value is not output. In order to avoid this problem, the step of clipping the signal value in the output image within a predetermined range may be provided before the gamma correction is executed. The predetermined range is a range in which the gamma correction is defined and the differential does not diverge. For example, in the expression (1), the clipping lower limit is set to a positive fine value, and the upper limit is set to 1.

Similarly, the signal value of the estimated image may exceed the range of the image signal. Therefore, the step S204 may clip the signal value of the estimated image. Clipping may use a value of 0 to 1 when the signal value is normalized, and may use the signal value of the optical black and the luminance saturation value when the signal value is not normalized.

The learning step according to this embodiment learns the network parameter for each information on a single gamma correction. When there are many types of candidate gamma corrections, a data capacity of the network parameter increases. One solution is to collectively learn the network parameters for a plurality of gamma corrections. For example, learning may use the error $L_{sum}$ expressed by the following expression (7).

$$L_{sum} = \frac{1}{2NM} \sum_{k}^{M} \sum_{j}^{N} |g_k(t_j) - g_k(y_j)|^2 \quad (7)$$

In the expression (7), "$g_k$" is a gamma correction designated by k, and varies according to k. "M" is the total number of types of gamma corrections. The network parameter capacity can be reduced by performing each of a plurality of gamma corrections for the correct image and the output image and by learning using the combined error $L_{sum}$ of the plurality of calculated errors.

This embodiment can provide an image processing system which can acquire a multilayer neural network having an estimation accuracy less likely to be influenced by the magnitude of the signal value of the developed image and can provide an estimation using the neural network.

Second Embodiment

Next follows a description of an image processing system according to a second embodiment of the present invention. In the image processing system according to this embodiment, an apparatus (server 301) that performs the learning step and the estimation step, and a plurality of imaging apparatuses (a first imaging apparatus 311, a second imaging apparatus 312, and a third imaging apparatus 313) are connected to one another. The estimation step according to this embodiment uses, but is not limited to, the upsampling.

Figure 8:
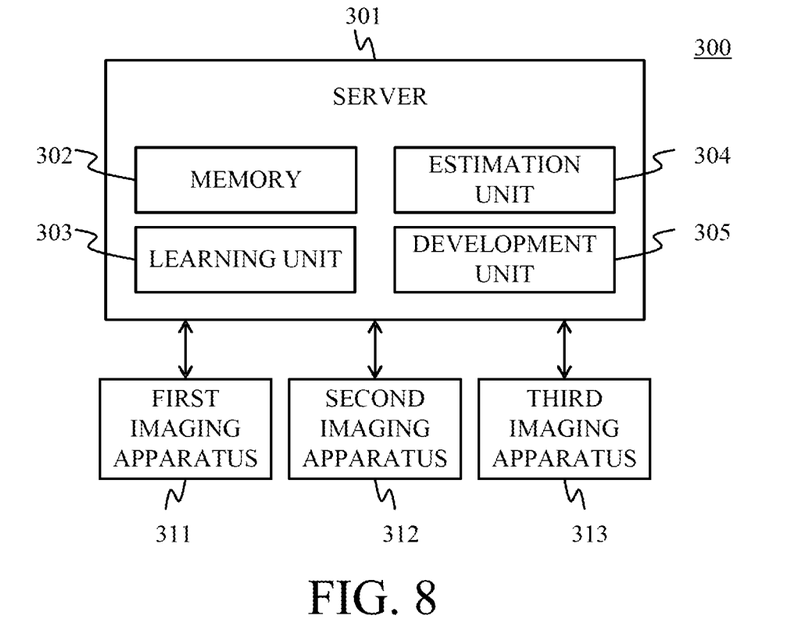
FIG. 8 is a block diagram of an image processing system according to the second embodiment.
Figure 9:
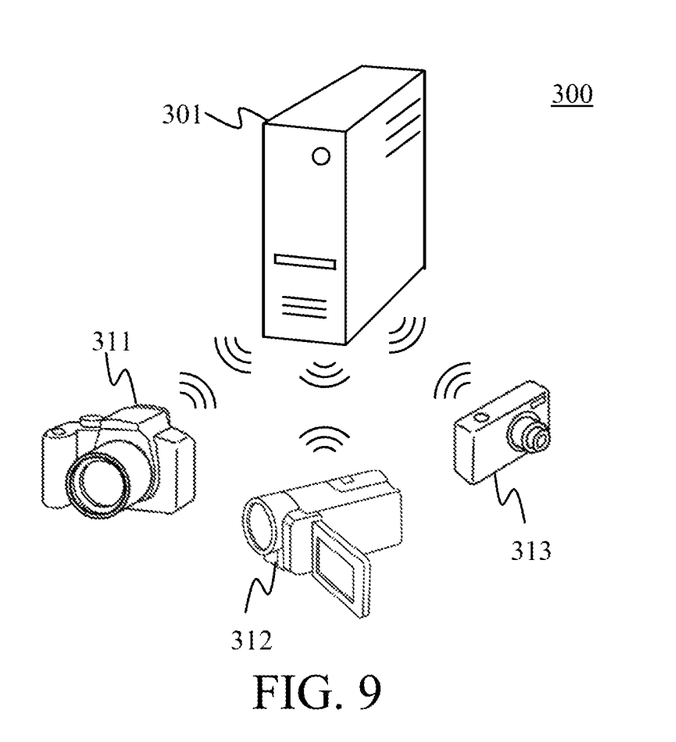
FIG. 9 is an external overview of the image processing system according to the second embodiment.

Referring now to FIGS. 8 and 9, a description will be given of an image processing system according to this embodiment. FIG. 8 is a block diagram of an image processing system 300. FIG. 9 is an external overview of the image processing system 300. As illustrated in FIGS. 8 and 9, the image processing system 300 includes a server (image processing apparatus) 301, the first imaging apparatus 311, the second imaging apparatus 312, and the third imaging apparatus 313. The server 301 includes a memory (or storage unit) 302, a learning unit 303, an estimation unit 304, and a development unit 305. The learning unit 303 reads a plurality of training images and correct images stored in the memory 302, executes the learning step, and learns network parameters (a weight and a bias) of the neural network. The learning unit 303 similarly serves as the acquisition unit 103a, the generation unit 103b, the calculation unit 103c, and the updating unit 103d illustrated in FIG. 3.

In this embodiment, the training image is a low-resolution image (image having a first resolution) and the correct image is a high-resolution image (image having a second resolution higher than the first resolution). The training image can be prepared by downsampling the correct image. Alternatively, in this embodiment, the training image may be a low-contrast image (image having a first contrast), and the correct image may be a high-contrast image (image having a second contrast higher than the first contrast).

The training image and the correct image may or may not be sized. Where a training image is generated by downsampling the correct image by 1/n, the size can be adjusted by stretching the training image n times through the interpolation such as a bicubic interpolation. When the size is not adjusted, a deconvolution layer, a depooling layer, etc. may be inserted into the network.

The learning unit 303 learns the network parameter using the network illustrated in FIG. 1. In this embodiment, the learning unit 303 learns the network parameter so as to minimize the error in which a plurality of gamma corrections are mixed, as in the expression (7). The learned network parameter is stored in the memory 302. The server 301 is wirelessly connected to a plurality of imaging apparatuses (the first imaging apparatus 311, the second imaging apparatus 312, and the third imaging apparatus 313), and receives a captured image from each imaging apparatus. The captured image is a RAW image. The estimation unit 304 reads the network parameter out of the memory 302 and performs the estimation step for the captured image. Thereby, the upsampled captured image is generated. The upsampled captured image is developed by the development unit 305 and transmitted to the original imaging apparatus.

The learning step executed by the learning unit 303 is similar to that described with reference to FIG. 5. However, this embodiment does not include the step S102. The estimation step performed by the estimation unit 304 is similar to that described with reference to FIG. 7.

This embodiment can provide an image processing system which can acquire a multilayer neural network in which the estimation accuracy is less likely to be influenced by the magnitude of the signal value of the developed image and can provide an estimation through the multilayer neural network.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

Each of the embodiments can provide an image processing method, an image processing apparatus, and a storage medium, which can acquire a multilayer neural network in which the estimation accuracy is less likely to be influenced by the magnitude of a developed image signal.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-001552, filed on Jan. 10, 2018 which is hereby incorporated by reference herein in its entirety.

What is claimed is:

1. An image processing method comprising the steps of:
acquiring a training image and a correct image;
inputting the training image into a multilayer neural network to generate an output image;
performing a gamma correction for each of the correct image and the output image and calculating an error between the correct image after the gamma correction and the output image after the gamma correction; and
updating a network parameter of the neural network using the error.

2. The image processing method according to claim 1, wherein each of the training image and the correct image has a plurality of color components periodically arranged,
wherein the image processing method further comprises:
a separating step for the training image configured to separate each of the plurality of color components of the training image; and
a separating step for the correct image configured to separate each of the plurality of color components of the correct image,
wherein the separating step for the training image is performed before the training image is input into the neural network, and
wherein the separating step for the correct image is performed before the error is calculated with the correct image.

3. The image processing method according to claim 1, further comprising the step of clipping a signal value of the output image in a predetermined range before the gamma correction is performed.

4. The image processing method according to claim 1, wherein the output image is an image having a resolution or contrast higher than that of the training image.

5. The image processing method according to claim 1, further comprising the steps of:
acquiring a lower limit value and an upper limit value of a signal value of each of the training image and the correct image; and
normalizing the signal value of each of the training image and the correct image using the lower limit value and the upper limit value.

6. The image processing method according to claim 1, further comprising the step of designating the gamma correction,
wherein the step of calculating the error performs the gamma correction designated in the step of designating the gamma correction, for each of the output image and the correct image.

7. The image processing method according to claim 6, further comprising the step of storing information on the gamma correction designated in the step of designating the gamma correction and the network parameter updated in the step of updating the network parameter.

8. The image processing method according to claim 1, wherein the updating of the network parameter updates the network parameter using a plurality of errors calculated by performing a plurality of gamma corrections for each of the correct image and the output image.

9. An image processing apparatus comprising:
at least one memory configured to store instructions; and
at least one processor communicatively connected to the at least one memory and configured to execute the stored instructions to:
acquire a training image and a correct image;
input the training image into a multilayer neural network and generate an output image;
perform a gamma correction for each of the correct image and the output image and calculate an error between the correct image after the gamma correction and the output image after the gamma correction; and
update a network parameter of the neural network using the error.

10. The image processing apparatus according to claim 9, wherein the network parameter is stored in the memory.

11. A non-transitory computer-readable storage medium configured to store a program for causing a computer to execute an image processing method comprising the steps of:
acquiring a training image and a correct image;
inputting the training image into a multilayer neural network to generate an output image;
performing a gamma correction for each of the correct image and the output image and calculating an error between the correct image after the gamma correction and the output image after the gamma correction; and
updating a network parameter of the neural network using the error.

* * * * *